United States Patent [19]
Sommi

[11] Patent Number: 5,570,791
[45] Date of Patent: Nov. 5, 1996

[54] COMPACT DISK TACK DISPLAY DEVICE

[76] Inventor: William Sommi, 42 Orchard St., Oyster Bay, N.Y. 11771

[21] Appl. No.: 406,120

[22] Filed: Mar. 17, 1995

[51] Int. Cl.[6] .................................................. A47F 7/00
[52] U.S. Cl. ........................................................ 211/40
[58] Field of Search ............................ 211/40, 88, 87; 206/308.1, 310, 303, 493

[56] References Cited

U.S. PATENT DOCUMENTS

| | | | |
|---|---|---|---|
| 1,195,642 | 8/1916 | Bauer | 211/41 |
| 4,948,022 | 8/1990 | VanDyke | 206/308.1 X |
| 5,040,687 | 8/1991 | Whittington | 211/40 |
| 5,048,681 | 9/1991 | Henkel | 206/312 |
| 5,078,270 | 1/1992 | Campbell | 206/444 |
| 5,105,952 | 4/1992 | Krattiger | 211/41 |
| 5,477,961 | 12/1995 | Taniyama | 206/308.1 |
| 5,505,299 | 4/1996 | Ditzig et al. | 206/308.1 |

*Primary Examiner*—Alvin C. Chin-Shue
*Assistant Examiner*—Sarah L. Purol
*Attorney, Agent, or Firm*—Richard L. Miller, P.E.

[57] ABSTRACT

A compact disc tack display device comprising a cylindrical receptacle having an open top. A component is for cushioning a compact disc within the cylindrical receptacle. An element is for protecting the compact disc when placed within the cylindrical receptacle. An assembly is for retaining the protecting element over the cylindrical receptacle. A tack centrally extends from the rear of the cylindrical receptacle, for mounting the cylindrical receptacle to a vertical flat surface, so as to be visually seen therefrom.

6 Claims, 1 Drawing Sheet

COMPACT DISK TACK DISPLAY DEVICE

BACKGROUND OF THE INVENTION

The instant invention relates generally to storage and display apparatuses for compact discs and more specifically it relates to a compact disc tack display device.

Numerous storage and display apparatuses for compact discs have been provided in prior art that are adapted to protect the compact discs from dust and in some instances the apparatuses can be mounted onto walls, so that the compact discs can be viewed therefrom. For example, U.S. Pat. No. 5,040,687 to Whittington; U.S. Pat. No. 5,048,681 to Henkel; U.S. Pat. No. 5,078,270 to Campbell; U.S. Pat. No. 5,105,952 to Krattiger and U.S. Pat. No. 5,195,642 to Dardashti all are illustrative of such prior art. While these units may be suitable for the particular purpose to which they address, they would not be as suitable for the purposes of the present invention as heretofore described.

SUMMARY OF THE INVENTION

A primary object of the present invention is to provide a compact disc tack display device that will overcome the shortcomings of the prior art devices.

Another object is to provide a compact disc tack display device, in which one compact disc can be inserted into the device in a protective manner and then retained onto a vertical surface by a built-in tack, so as to be visually seen therefrom.

An additional object is to provide a compact disc tack display device, in which a transparent cover is placed over the compact disc to protect it from dust, once the compact disc is inserted into the device against a padding and supported therein in a vertical position.

A further object is to provide a compact disc tack display device that is simple and easy to use.

A still further object is to provide a compact disc tack display device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The Figures on the drawings are briefly described as follows.

Figure 1:
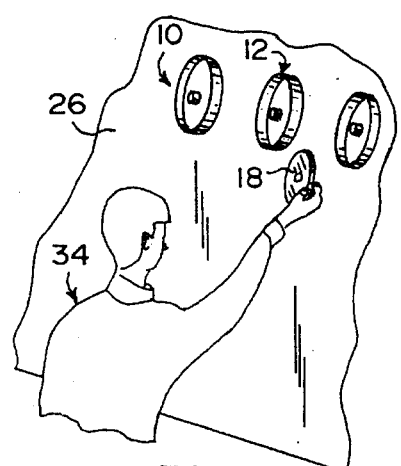
FIG. 1 is a diagrammatic perspective view illustrating the instant invention in use.
Figure 2:
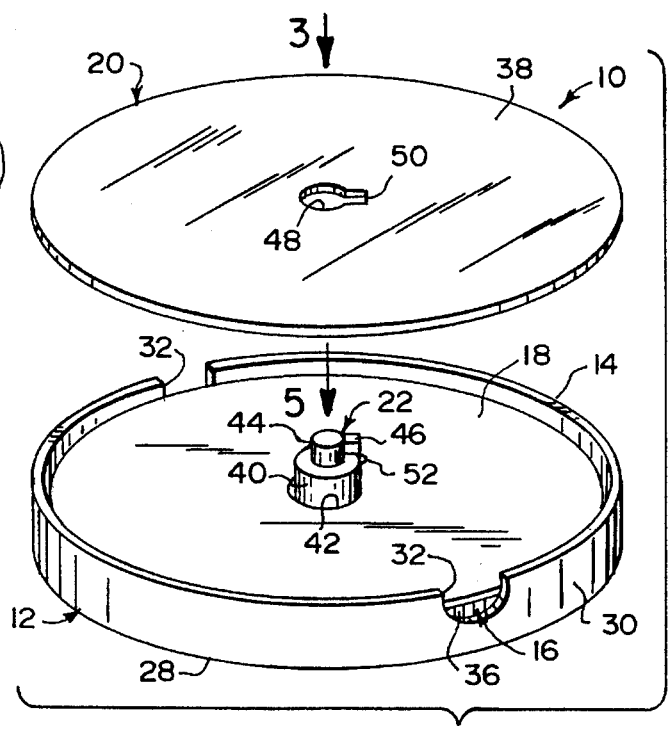
FIG. 2 is a diagrammatic exploded perspective view of the instant invention per se.
Figure 4:
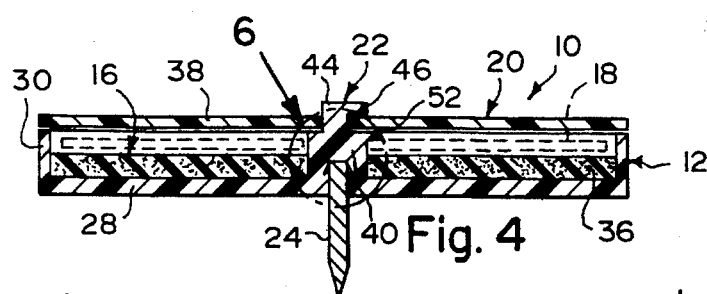
FIG. 4 is a cross sectional view taken on line 4—4 of FIG. 3.
Figure 5:
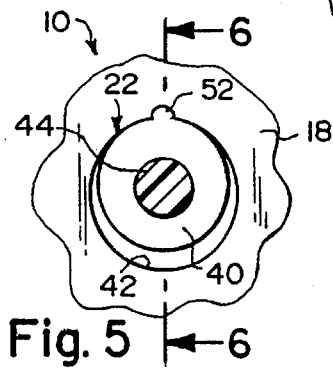
Figure 6:
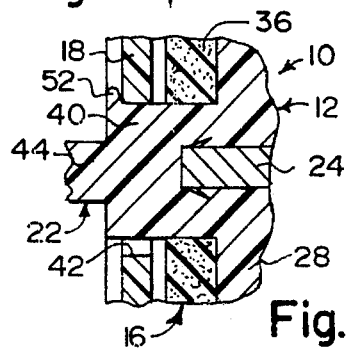
Figure 3:
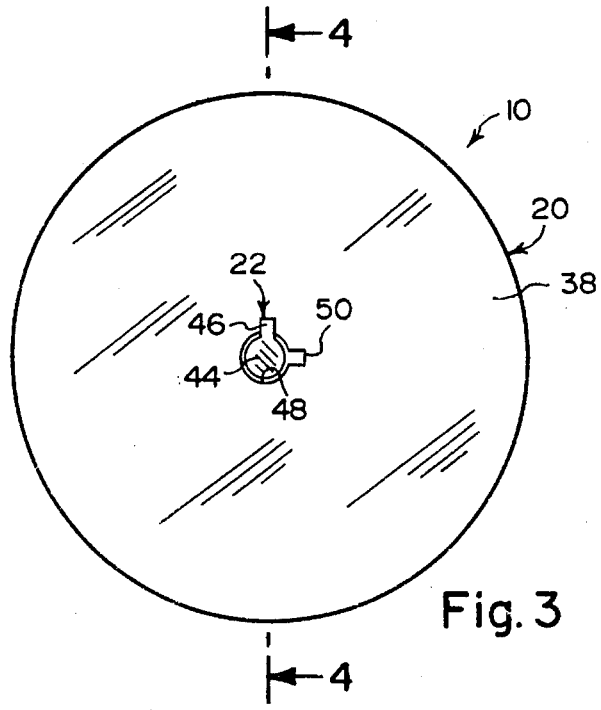
FIG. 3 is an elevational view taken in the direction of arrow 3 in FIG. 2 with the cover locked in place.

FIG. 5 is an enlarged elevational view taken in the direction of arrow 5 in FIG. 2 with parts broken away; and FIG. 6 is an enlarged cross sectional view as indicated by arrow 6 in FIG. 4 and taken on line 6—6 of FIG. 5.

DETAILED DESCRIPTION OF THE PREFERRED EMBODIMENTS

Turning now descriptively to the drawings, in which similar reference characters denote similar elements throughout the several views, FIGS. 1 through 6 illustrate a compact disc tack display device 10, comprising a cylindrical receptacle 12 having an open top 14. A component 16 is for cushioning a compact disc 18 within the cylindrical receptacle. An element 20 is for protecting the compact disc 18, when placed within the cylindrical receptacle 12. An assembly 22 is for retaining the protecting element 20 over the cylindrical receptacle 12. A tack 24 centrally extends from the rear of the cylindrical receptacle 12, for mounting the cylindrical receptacle 12 to a vertical flat surface 26, so as to be visually seen therefrom.

The cylindrical receptacle 12 includes a circular base plate 28. An annular side wall 30 extends from the circular base plate 28. The annular side wall 30 has a pair of opposite finger cutout areas 32, so that a person 34 gripping the compact disc 18 can position same within the cylindrical receptacle 12.

The cushioning component 16 is a round thin foam pad 36, which fits into the cylindrical receptacle 12 against the circular base plate 28. The protecting element 20 is a transparent disc-shaped cover 38, which fits over the open top 14 of the cylindrical receptacle 12 and onto an upper edge of the annular side wall 30.

The retaining assembly 22 consists of a spindle 40 extending from the center of the circular base plate 28. The spindle 40 has a diameter slightly smaller than the center hole 42 of the compact disc 18. A shank 44 is integral with an extends from the spindle 40. The shank 44 has a diameter slightly smaller than the spindle 40. A key 46 is formed perpendicular to a distal end of the shank 44. The transparent disc-shaped cover 38 has a central aperture 48 with a keyway 50. When the disc-shaped cover 38 is placed onto the upper edge of the annular side wall 30 with the keyway 50 in alignment with the key 46 and then rotated, it will be retained thereto.

A small projection 52 is on a distal end of the spindle 40, directly adjacent the key 46. When the device 10 is mounted to the vertical flat surface 26 with the key 46 extending upwardly, the projection 52 will prevent the compact disc 38 from slipping off of the spindle 40.

OPERATION OF THE INVENTION

To use the compact disc display device 10, a person simply inserts the tack 24 into the vertical flat surface 26 with the key 46 facing upwardly. The compact disc 18 is then placed over the spindle 40 with the upper portion of the center hole 42 resting on the spindle 40 between the round thin foam pad 36 and the projection 52. The central aperture 48 of the transparent disc-shaped cover 38 with the keyway 50 in alignment with the key 46 is placed over the shank 44. The transparent disc-shaped cover 38 is then rotated to take the keyway 50 out of alignment with the key 46, so that it is retained thereto.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A compact disc tack display device comprising:

a) a cylindrical receptacle having an open top;

b) means for cushioning a compact disc within said cylindrical receptacle;

c) means for protecting the compact disc when placed within said cylindrical receptacle;

d) means for retaining said protecting means over said cylindrical receptacle; and e) a tack centrally extending from the rear of said cylindrical receptacle for mounting said cylindrical receptacle to a vertical flat surface, so as to be visually seen therefrom.

2. A compact disc tack display device as recited in claim 1, wherein said cylindrical receptacle includes:

a) a circular base plate; and b) an annular side wall extending from said circular base plate, said annular side wall having a pair of opposite finger cutout areas, so that a person griping the compact disc can position same within said cylindrical receptacle.

3. A compact disc tack display device as recited in claim 2, wherein said cushioning means is a round thin foam pad, which fits into said cylindrical receptacle against said circular base plate.

4. A compact disc tack display device as recited in claim 3, wherein said protecting means is a transparent disc-shaped cover, which fits over the open top of said cylindrical receptacle and onto an upper edge of said annular side wall.

5. A compact disc tack display device as recited in claim 4, wherein said retaining means includes:

a) a spindle extending from the center of said circular base plate, said spindle having a diameter slightly smaller than the center hole of the compact disc;

b) a shank integral with and extending from said spindle, said shank having a diameter slightly smaller than said spindle;

c) a key formed perpendicular to a distal end of said shank; and d) said transparent disc-shaped cover having a central aperture with a keyway, so that when said disc-shaped cover is placed onto the upper edge of said annular side wall with said keyway in alignment with said key and then rotated it will be retained thereto.

6. A compact disc tack display device as recited in claim 5, further including a small projection on a distal end of said spindle directly adjacent said key, so that when said device is mounted to the vertical flat surface with the key extending upwardly, said projection will prevent the compact disc from slipping off of said spindle.

\* \* \* \* \*